(12) United States Patent
Cho et al.

(10) Patent No.: US 12,537,084 B2
(45) Date of Patent: Jan. 27, 2026

(54) ELECTRONIC APPARATUS FOR HEALTH MANAGEMENT AND OPERATING METHOD THEREFOR

(71) Applicant: Samsung Electronics Co., Ltd., Suwon-si (KR)

(72) Inventors: Seongho Cho, Suwon-si (KR); Jeongja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 18/188,134

(22) Filed: Mar. 22, 2023

(65) Prior Publication Data
US 2023/0223127 A1    Jul. 13, 2023

Related U.S. Application Data

(63) Continuation of application No. PCT/KR2022/007454, filed on May 25, 2022.

(30) Foreign Application Priority Data

May 25, 2021  (KR) .......................... 10-2021-0067086

(51) Int. Cl.
*G06Q 10/00* (2023.01)
*G16H 10/60* (2018.01)
(Continued)

(52) U.S. Cl.
CPC ............. *G16H 20/10* (2018.01); *G16H 10/60* (2018.01); *G16H 40/67* (2018.01)

(58) Field of Classification Search
CPC ......... G16H 20/10; G16H 40/67; G16H 10/60
See application file for complete search history.

(56) References Cited

U.S. PATENT DOCUMENTS

| 6,455,555 B1* | 9/2002 | Nakagawa | ........... C07D 215/12 |
| | | | 548/146 |
| 10,553,320 B1* | 2/2020 | McNair | .................. G16H 10/60 |

(Continued)

FOREIGN PATENT DOCUMENTS

| CA | 3 130 620 A1 | 8/2020 |
| JP | H09-103413 A | 4/1997 |

(Continued)

OTHER PUBLICATIONS

International Search Report dated Sep. 7, 2022, issued in International Patent Application No. PCT/KR2022/007454.
(Continued)

*Primary Examiner* — Rajesh Khattar
(74) *Attorney, Agent, or Firm* — Jefferson IP Law, LLP

(57) ABSTRACT

An electronic device is provided. The electronic device includes a communication circuit, a display, a memory for storing a first application that presents a behavioral treatment regimen for a disease or lifestyle of a user of the electronic device and a second application that manages user's health records, and at least one processor electrically coupled to the display and the memory. The at least one processor may acquire biometric information about the user of the electronic device, provide biorhythm information, based on the acquired biometric information, provide prescription information through the first application, provide dose information, based on the prescription information and the biorhythm information, through the second application, and present a dose notification, based on the dose information.

17 Claims, 12 Drawing Sheets

(51) Int. Cl.
*G16H 20/10* (2018.01)
*G16H 40/67* (2018.01)

(56) References Cited

U.S. PATENT DOCUMENTS

| | | | |
|---|---|---|---|
| 11,039,986 B2 | 6/2021 | Jain et al. | |
| 11,699,511 B2 * | 7/2023 | Sysko | G16H 20/60 |
| | | | 705/2 |
| 2012/0143621 A1 | 6/2012 | Lee et al. | |
| 2016/0106339 A1 * | 4/2016 | Behzadi | G16H 20/10 |
| | | | 600/302 |
| 2016/0180026 A1 | 6/2016 | Kim et al. | |
| 2017/0011182 A1 | 1/2017 | Whitehurst | |
| 2017/0246086 A1 | 8/2017 | Jain et al. | |
| 2021/0272672 A1 | 9/2021 | Sung | |

FOREIGN PATENT DOCUMENTS

| | | |
|---|---|---|
| JP | 2005-276191 A | 10/2005 |
| KR | 10-2012-0076689 A | 7/2012 |
| KR | 10-2016-0076264 A | 6/2016 |
| KR | 10-2017-0085887 A | 7/2017 |
| KR | 10-2017-0087299 A | 7/2017 |
| KR | 10-2018-0110188 A | 10/2018 |
| KR | 10-1958818 B1 | 7/2019 |
| KR | 10-2022628 B1 | 9/2019 |
| KR | 10-2027359 B1 | 11/2019 |
| KR | 10-2020-0025756 A | 3/2020 |
| KR | 102162522 B1 * | 10/2020 |
| KR | 10-2190056 B1 | 12/2020 |
| KR | 10-2021-0035662 A | 4/2021 |
| KR | 10-2021-0057423 A | 5/2021 |
| WO | 2012/077955 A2 | 6/2012 |

OTHER PUBLICATIONS

Extended European Search Report dated Jul. 31, 2024, issued in European Application No. 22811654.7-1122.

* cited by examiner

ELECTRONIC APPARATUS FOR HEALTH MANAGEMENT AND OPERATING METHOD THEREFOR

CROSS-REFERENCE TO RELATED APPLICATION(S)

This application is a continuation application, claiming priority under § 365(c), of an International application No. PCT/KR2022/007454, filed on May 25, 2022, which is based on and claims the benefit of a Korean patent application number 10-2021-0067086, filed on May 25, 2021, in the Korean Intellectual Property Office, the disclosure of which is incorporated by reference herein in its entirety.

BACKGROUND

1. Field

The disclosure relates to an electronic device and method for performing a user-customized health care. More particularly, the disclosure relates to an electronic device and method for presenting functions related to various health cares including a medication time and a medication method by using user's biorhythm information.

2. Description of Related Art

As the lifespan of human beings has greatly increased thanks to the development of medical technologies, the number of people who need a continuous health care, such as the elderly or chronic illness patient, an obese and geriatric patient, or the like, has increased. In particular, the number of people with chronic diseases is increasing significantly. In addition, even if people do not have these diseases, the number of people who want to manage their health while always exercising or dieting so as to maintain a body shape, maintain health, and prevent diseases has greatly increased.

It is common for people with chronic diseases to treat their diseases by taking medication prescribed by a doctor for a long period of time. In addition, it is effective to treat diseases by, in addition to medication, concurrently exercising or maintaining a life pattern suitable for biorhythm. However, there is a difficulty in that it is not easy to take medicine and exercise regularly at home with a normal will. Accordingly, there is a need for a technology capable of effectively providing a customized health care suitable for a user by setting a dose time and behavior standard suitable for the user.

In accordance with the above-mentioned need, a digital therapeutic agent representing an application having a function, such as a medicine for treating diseases or improving health through software rather than medicines are being used. Hereinafter, the digital therapeutic agent can represent various health care applications capable of providing behavioral prescription and medicine prescription services.

The above information is presented as background information only to assist with an understanding of the disclosure. No determination has been made, and no assertion is made, as to whether any of the above might be applicable as prior art with regard to the disclosure.

SUMMARY

The aforementioned digital therapeutic agent is a therapeutic agent proposed for the purpose of treating a specific disease. Even if the digital therapeutic agent is a therapeutic agent for the same disease, it is necessary to be personalized for each user of the electronic device, in order to optimize a therapeutic effect. For example, it is necessary to investigate daily activities of users of electronic devices, medications, or specific situations of the users. In addition, in order to optimize the therapeutic effect, it may be necessary to propose activities and medications to the user based on the user's specific situation. For example, when activity and medication prescription are made without considering a biorhythm of the user of the electronic device, the therapeutic effect may be poor.

In addition, a plurality of digital therapeutic agents can be prescribed for the user of the electronic device. In this case, in accordance with the prescription content included in each of the plurality of digital therapeutic agents, the user may be simultaneously requested for an activity proposal or medication proposal.

For example, in the case of a person receiving treatment for insomnia and diabetes at the same time, when two different digital therapeutic agents are prescribed, a daytime activity required by an insomnia therapeutic agent, and an activity time required to lower a blood glucose, proposed by a diabetes therapeutic agent can be requested at the same time. Accordingly, when there are a plurality of prescription information provided through the digital therapeutic agent, the electronic device needs to adjust the prescription information.

Aspects of the disclosure are to address at least the above-mentioned problems and/or disadvantages and to provide at least the advantages described below. Accordingly, an aspect of the disclosure is to provide an electronic device and method for presenting functions related to various health cares including a medication time and a medication method by using user's biorhythm information.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a display, a memory for storing a first application that presents a behavioral treatment regimen for a disease or lifestyle of a user of the electronic device and a second application that manages user's health records, and at least one processor electrically coupled to the display and the memory. The at least one processor may acquire biometric information about the user of the electronic device, provide biorhythm information, based on the acquired biometric information, provide prescription information through the first application, provide dose information, based on the prescription information and the biorhythm information, through the second application, and present a dose notification, based on the dose information. The dose information may include medication time information for the prescription information.

In accordance with another aspect of the disclosure, a method of operating an electronic device is provided. The method includes storing, in a memory included in the electronic device, a first application that presents a behavioral treatment regimen for a disease or lifestyle of a user of the electronic device and a second application that manages user's health related records, acquiring biometric information about the user of the electronic device, providing biorhythm information, based on the biometric information, providing prescription information through the first application, providing dose information including medication time information, based on the prescription information and the biorhythm information, through the second application, and presenting a notification, based on the dose information.

An electronic device of various embodiments of the disclosure and an operating method thereof may provide biorhythm information of a user of the electronic device, based on biometric information of the user of the electronic device.

An electronic device of various embodiments of the disclosure and an operating method thereof may present an optimal activity or medication time notification by using biorhythm information of a user of the electronic device and/or prescription information that is based on a digital therapeutic agent.

An electronic device of various embodiments of the disclosure and an operating method thereof may, when a plurality of prescription information are provided based on one or more plurality of digital therapeutic agents, control an activity of the same time point, a measurement and acquisition of biometric information, or a medication notification, based on biorhythm information and respective prescription information.

An electronic device of various embodiments of the disclosure and an operating method thereof may present a health care application and/or a health care platform for managing a plurality of digital therapeutic agents.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
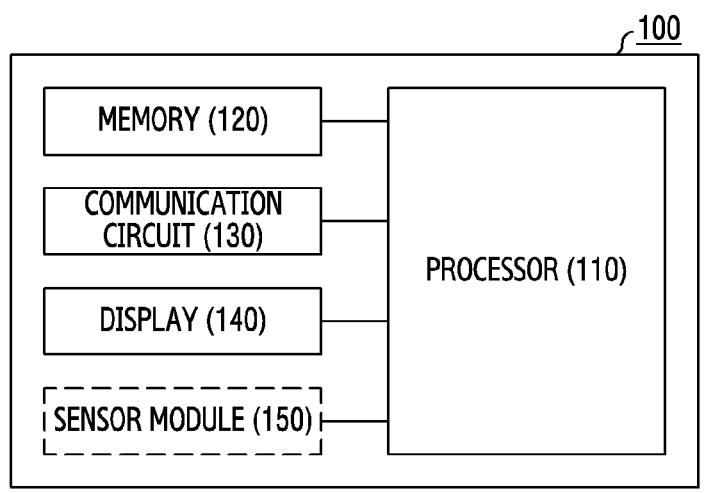
FIG. 1 is a block diagram of an electronic device according to an embodiment of the disclosure.

FIG. 1 is a block diagram of an electronic device according to an embodiment of the disclosure.

Referring to FIG. 1, an electronic device 100 may include at least one processor 110, a memory 120, a communication circuit 130, a display 140, and a sensor module 150. The components enumerated above may be operatively or electrically connected to each other. The components of the electronic device 100 illustrated in FIG. 1 may be partially modified, deleted, or added as an example.

According to an embodiment of the disclosure, the processor 110 may be electrically or operatively connected to the memory 120, the communication circuit 130, the display 140, and the sensor module 150. According to an embodiment of the disclosure, by using instructions stored in the memory 120, the processor 110 may execute an operation or data processing related to control and/or communication of at least one other component of the electronic device 100. According to an embodiment of the disclosure, the processor 110 may include at least one of a central processing unit (CPU), a graphics processing unit (GPU), a micro controller unit (MCU), a sensor hub, a supplementary processor, a communication processor, an application processor, an application specific integrated circuit (ASIC), field programmable gate arrays (FPGA), and a neural processing unit (NPU), and may have a plurality of cores.

According to an embodiment of the disclosure, the memory 120 may store instructions for, when executed, allowing the processor 110 to process data or control the components of the electronic device 100 in order to perform an operation of the electronic device 100. According to an embodiment of the disclosure, the memory 120 may store at least one application capable of performing various functions.

According to an embodiment of the disclosure, the memory 120 may store a medical device application (e.g., a digital therapeutic agent application) that is used for the purpose of preventing, managing, and treating a disease, based on a medical basis, by using the electronic device 100. In addition, the memory 120 may store an application (e.g., a wellness application) presenting a service of managing health-related records, such as an exercise, a diet, a sleep, and a heart rate to the user of the electronic device 100. Hereinafter, the application presenting the service of managing the health-related records, such as the exercise, the diet, the sleep, and the heart rate to the user of the electronic device 100 may be expressed as a wellness application. Accordingly, the wellness application in the disclosure may include an application presenting a health-related service.

According to an embodiment of the disclosure, the digital therapeutic agent application may be expressed as a digital therapeutic agent. The digital therapeutic agent application of an embodiment may be implemented wherein a behavioral treatment regimen for a disease or lifestyle of the user of the electronic device 100 may be followed through software. For example, when the digital therapeutic agent application is a blood glucose therapeutic agent, the digital therapeutic agent application may present a notification of guiding the user of the electronic device to record body weight, blood pressure, and blood glucose information along with diet, sleep, activity, and medication records. In addition, as the digital therapeutic agent application is executed, the digital therapeutic agent application may propose meal and medication time, based on recorded data on the user of the electronic device, or propose a method for improving eating habits or methods for improving exercise and sleep.

According to an embodiment of the disclosure, the wellness application may be an application stored in the memory 120 through a manufacturer of the electronic device 100 or an application downloaded by the user of the electronic device 100 through a server. According to an embodiment of the disclosure, the wellness application may include various applications presenting services related to health care of the user of the electronic device 100. Accordingly, in the disclosure, the wellness application has been expressed for description convenience's sake, but the disclosure is not limited thereto, and may represent various applications presenting health care services. Hereinafter, the applications expressed as the wellness applications may refer to various applications presenting the health care services.

According to an embodiment of the disclosure, the memory 120 may store various information related to the user of the electronic device 100 acquired through the processor 110. For example, the memory 120 may store biometric information of the user of the electronic device 100.

According to an embodiment of the disclosure, the electronic device 100 may communicate with at least one external device described later with reference to FIG. 3 through the communication circuit 130. The electronic device 100 may transmit various data provided by the processor 110 to the at least one external device through the communication circuit 130. In addition, the electronic device 100 may receive necessary information from the at least one external device by using the communication circuit 130. For example, the processor 110 may transceive prescription information, medication information, or biometric information to the at least one external device through the communication circuit 130. According to various embodiments of the disclosure, the processor 110 may transceive prescription information or medication information from at least one external device through the communication circuit 130.

According to an embodiment of the disclosure, the display 140 may display various types of contents (e.g., a text, an image, a video, an icon, and/or a symbol, or the like). According to an embodiment of the disclosure, the display 140 may include a liquid crystal display (LCD), a light emitting diode (LED) display, or an organic light emitting diode (OLED) display. According to an embodiment of the disclosure, the processor 110 may control the display 140 to display various contents related to the execution of the digital therapeutic agent application or the wellness application. For example, the processor 110 may control the display 140 to display a screen when a wellness application execution event occurs. According to various embodiments of the disclosure, the contents displayed by the display 140 according to the execution of the digital therapeutic agent application and/or the wellness application will be described below with reference to FIGS. 10 and 11.

According to an embodiment of the disclosure, the sensor module 150 may include various sensors. For example, the sensor module 150 may include at least one of an acceleration sensor, a proximity sensor, a gyro sensor, a temperature sensor, an iris sensor, a temperature/humidity sensor of the disclosure, an illuminance sensor, and a time of flight (TOF) sensor. According to an embodiment of the disclosure, by using various sensors included in the sensor module 150, the processor 110 may determine a user's situation or a user's external environment. For example, the processor 110 may acquire user's biometric information from the sensor module 150. According to an embodiment of the disclosure, the processor 110 may acquire a photoplethysmography (PPG) signal, an electrocardiogram (ECG) signal, a body temperature, a blood glucose, a body composition ratio, and the like from the sensor module 150.

In the document, the sensor module 150 may be referred to as at least one sensor, sensor circuitry, or the like.

According to an embodiment of the disclosure, the processor 110 may acquire biometric information of the user of the electronic device 100. The biometric information of an embodiment may be acquired through the sensor module 150 included in the electronic device 100. According to another embodiment of the disclosure, the processor 110 may acquire the biometric information from at least one external device connected to the electronic device 100 through the communication circuit 130.

According to an embodiment of the disclosure, the processor 110 may provide biorhythm information, based on the acquired biometric information. According to an embodiment of the disclosure, the processor 110 may provide the biorhythm information of the user of the electronic device 100, based on BMI information, activity information, and electrocardiogram information included in the biometric information. For example, the processor 110 may provide the biorhythm information by using a regression model (e.g., ARMAX, Autoregressive Moving average with exogenous input) that is based on a body mass index, user's activity information, and a heart rate.

According to an embodiment of the disclosure, the processor 110 may provide prescription information by using at least one digital therapeutic agent application stored in the memory 120. The prescription information of an embodiment may include activity prescription and/or medication prescription required by the user.

According to an embodiment of the disclosure, the processor 110 may provide dose information, based on the prescription information and the biorhythm information, through the wellness application stored in the memory 120. For example, the processor 110 may set a medication time, based on the prescription information acquired through at least one digital therapeutic agent application and the biorhythm information. According to an embodiment of the disclosure, medication information may include various information, such as a medication time, a medication method and/or a dosage, an activity time, or the like.

According to an embodiment of the disclosure, the processor 110 may store provided various information related to health care in the memory 120. For example, the processor 110 may store at least one of biometric information, biorhythm information, prescription information, and/or dose information in the memory 120.

Figure 2:
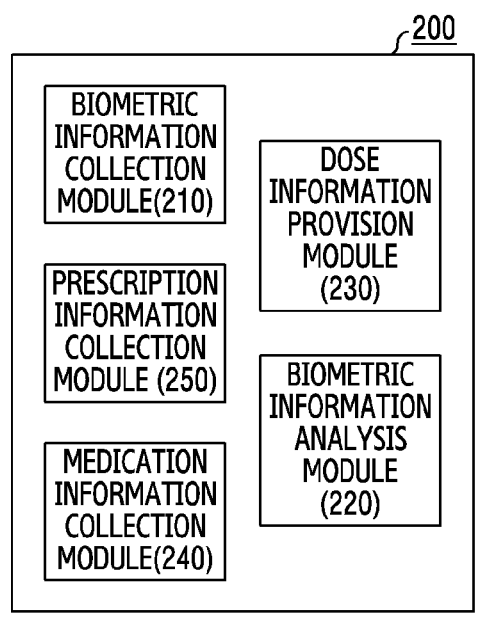
FIG. 2 is a block diagram of at least one processor according to an embodiment of the disclosure.

FIG. 2 is a block diagram of at least one processor according to an embodiment of the disclosure.

Referring to FIG. 2, a health care module 200 executed through the processor 110 may presented. The health care module 200 of an embodiment may include a biometric information collection module 210, a medication information collection module 250, a prescription information collection module 240, a dose information provision module 230, and/or a biometric information analysis module 220. According to an embodiment of the disclosure, the execution of the health care module 200 may represent the execution of the digital therapeutic agent application executed through the processor 110.

The biometric information collection module 210 of an embodiment may acquire data related to user's activity information and/or biometric information. According to an embodiment of the disclosure, the biometric information collection module 210 may collect information, such as a user's exercise record or number of steps and collect a record including data on a user's activity amount and time. In addition, the biometric information collection module 210 may collect a record related to the user's biometric information through the sensor module 150 included in the electronic device 100. For example, the biometric information collection module 210 may acquire the user's biometric information, such as a heart rate, a stress, an oxygen saturation, a skin temperature, a core body temperature, an electrocardiogram, a respiration rate, a sleep, a blood pressure and/or a blood glucose, through the sensor module 150.

According to an embodiment of the disclosure, the biometric information collection module 210 may acquire activity information and/or biometric information of a user of the electronic device 100 through at least one external device connected through the communication circuit 130. For example, the biometric information collection module 210 may request data on the biometric information to the at least one external device through the communication circuit 130, and may receive data on activity information and/or biometric information from the at least one external device.

According to an embodiment of the disclosure, the biometric information analysis module 220 may estimate a user's biorhythm, based on the biometric information collected through the biometric information collection module 210. For example, the biometric information analysis module 220 may estimate the biorhythm, based on at least one of user's age, height, body weight, activity information, and electrocardiogram. According to various embodiments of the disclosure, the biometric information analysis module 220 may estimate the biorhythm of the user of the electronic device 100 through various biorhythm estimation methods.

According to an embodiment of the disclosure, the prescription information collection module 240 may provide prescription data through the digital therapeutic agent application stored in the memory 120. According to an embodiment of the disclosure, the prescription information collection module 240 may provide prescription information which includes activity prescription and/or medication prescription prescribed for the user through the digital therapeutic agent application. For example, the prescription information collection module 240 may provide prescription information which includes activity prescription including at least one of user's exercise time, sleep time, and meal type and/or medication prescription including at least one of a type of dosed medicine, a dosage, a dosing method, and a medication time.

According to an embodiment of the disclosure, the medication information collection module 250 may record a time when a user has taken other medication, or collect medication records collected through an external device. For example, the medication information collection module 250 may store a medication record inputted through the user of the electronic device 100, or acquire a medication record collected through the communication circuit 130 from a device, such as a smart medicine bottle.

According to an embodiment of the disclosure, the dose information provision module 230 may provide dose information suitable for the user, based on biorhythm information provided through the biometric information analysis module 220. For example, the dose information provision module 230 may provide the dose information, based on prescription information provided through the prescription information collection module 240 and the biorhythm information provided through the biometric information analysis module 220. In addition, the dose information provision module 230 may provide the dose information, based on a medication record provided through the medication information collection module 240.

According to an embodiment of the disclosure, the dose information may include medication time information for prescription information. For example, the dose information may include information about a time to perform an activity that is prescribed based on activity prescription. Or, the dose information may include information about a time to take a medicine that is prescribed based on dose prescription.

Figure 3:
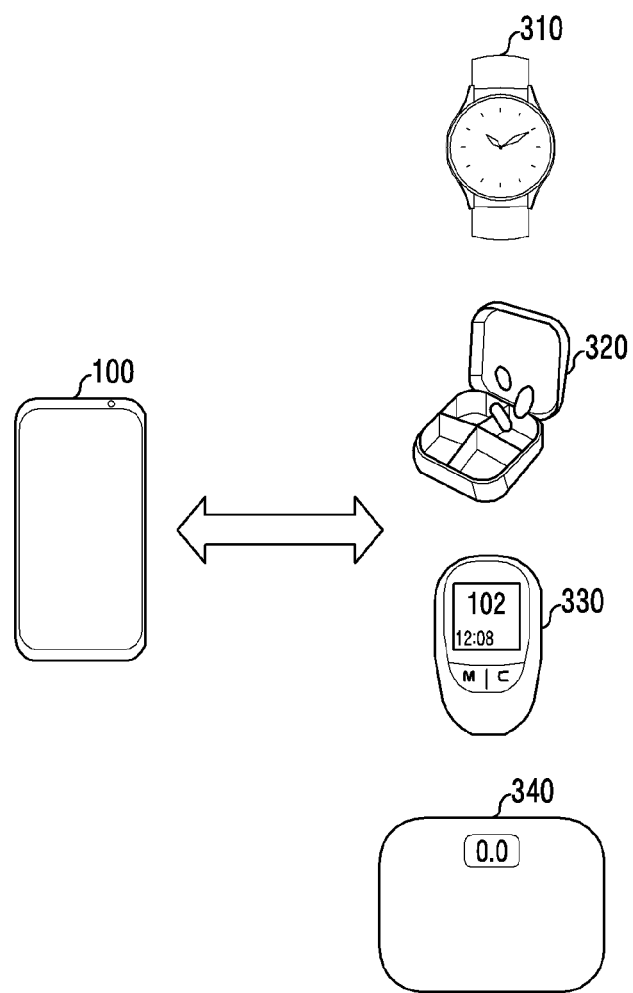
FIG. 3 is a diagram illustrating an electronic device and at least one external device according to an embodiment of the disclosure.

FIG. 3 is a diagram illustrating an electronic device and at least one external device according to an embodiment of the disclosure.

Referring to FIG. 3, the electronic device 100 may transceive various data with the at least one external device through the communication circuit 130. For example, the electronic device 100 may transceive data related to user's health information through a wearable device 310, a smart medicine bottle 320, a blood glucose meter 330 and/or a body weight scale 340 through the communication circuit 130.

According to an embodiment of the disclosure, the electronic device 100 may acquire biometric information of the user of the electronic device 100 through the wearable device 310. For example, the electronic device 100 may receive user's activity information and/or biometric information provided using the wearable device 310 through the communication circuit 130. According to an embodiment of the disclosure, the biometric information collection module 210 may request the acquired biometric information through the communication circuit 130 and receive the provided biometric information from the wearable device 310.

According to an embodiment of the disclosure, the electronic device 100 may acquire a record of taking a prescribed medicine by using the smart medicine bottle 320. For example, the smart medicine bottle 320 may provide information about a time of taking a prescribed medicine and an amount of medication. According to an embodiment of the disclosure, the medication information collection module 250 may request a medication record through the communication circuit 130, and receive medication record information provided from the smart medication bottle 320.

According to an embodiment of the disclosure, the electronic device 100 may collect user's biometric information by using the blood glucose meter 330 and/or the body weight scale 340. For example, the blood glucose meter 330 and/or the body weight scale 340 may provide blood glucose information and/or body weight information about the user. According to an embodiment of the disclosure, the biometric information collection module 210 may request the blood glucose information and/or the body weight information to each of the blood glucose meter 330 and/or the body weight scale 340 through the communication circuit 130 and receive the same, to provide biometric information.

In the disclosure, a description has been made for only the content in which the electronic device 100 transceives data with the wearable device 310, the smart medicine bottle 320, the blood glucose meter 330 and/or the body weight scale 340 for description convenience's sake, but is not limited thereto and the electronic device 100 may transceiver data required to execute health care applications with various external devices.

Figure 4:
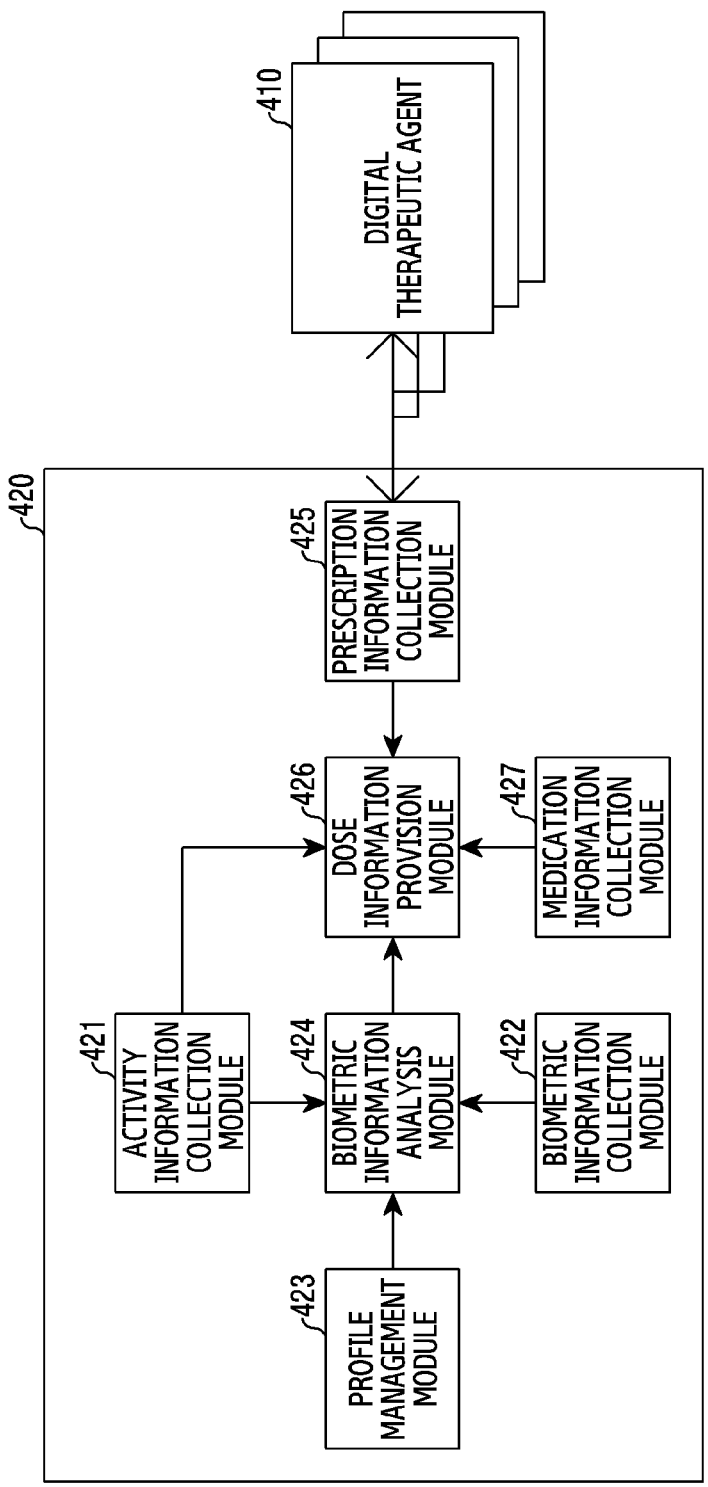
FIG. 4 is a diagram illustrating provision of dose information through a wellness application and a digital therapeutic agent according to an embodiment of the disclosure.

FIG. 4 is a diagram illustrating provision of dose information through a wellness application and a digital therapeutic agent according to an embodiment of the disclosure.

Referring to FIG. 4, the wellness application 420 and at least one digital therapeutic agent application 410 may be used to provide dose information. The wellness application 420 may include a module similar to the health care module 200 described with reference to FIG. 2. Accordingly, a description repeated with the health care module 200 may be omitted below.

According to an embodiment of the disclosure, the wellness application 420 may include an activity information collection module 421, a biometric information collection module 422, a profile management module 423, a biometric information analysis module 424, a medication information collection module 427, a dose information provision module 426 and/or a prescription information collection module 425. According to various embodiments of the disclosure, the wellness application 420 may include various modules necessary to execute the application, and the above-described modules may be integrated into at least one and be executed.

According to an embodiment of the disclosure, the activity information collection module 421 and the biometric information collection module 422 may perform functions similar to those of the biometric information collection module 210 described with reference to FIG. 2. In addition to this, the profile management module 423 of an embodiment may provide and manage profile information of the user of the electronic device 100.

According to an embodiment of the disclosure, the biometric information analysis module 424 may provide biorhythm information, based on biometric information provided through the activity information collection module 421, the biometric information collection module 422, and the profile management module 423. The biometric information analysis module 424 of an embodiment may perform a function similar to that of the biometric information analysis module 220 described with reference to FIG. 2.

According to an embodiment of the disclosure, the medication information collection module 427 may collect a record in which a user takes medicine. According to an embodiment of the disclosure, the medication information collection module 427 may perform a function similar to that of the medication information collection module 250 described with reference to FIG. 2.

According to an embodiment of the disclosure, the prescription information collection module 425 may collect prescription information provided through the at least one digital therapeutic agent application 410. The prescription information collection module 425 of an embodiment may request prescription information to the at least one digital therapeutic agent application 410, and receive and store the prescription information.

According to an embodiment of the disclosure, the dose information provision module 426 may provide dose information, based on at least one of biorhythm information provided from the biometric information analysis module 424, medication information acquired from the medication information collection module 427 and/or prescription information acquired from the prescription information collection module 425. According to an embodiment of the disclosure, the dose information may include information on a time for performing activity prescription and/or medication prescription included in the prescription information.

According to an embodiment of the disclosure, the prescription information provided through the at least one digital therapeutic agent application 410 may include a plurality of action prescriptions and/or a plurality of medication prescriptions, based on a plurality of digital therapeutic agent applications 410. According to an embodiment of the disclosure, the dose information provision module 426 may determine a plurality of medication time information that are based on each of the plurality of prescription information. According to an embodiment of the disclosure, when the same time, i.e., overlapped time information is included among the plurality of medication time information that are based on each of the plurality of prescription information, the overlapped time information may be changed based on the biorhythm information.

According to an embodiment of the disclosure, the wellness application 420 may present a dose notification to the user of the electronic device 100 through various methods, based on the dose information provided through the dose information provision module 426. For example, the wellness application 420 may present a dose notification through the display 140, based on the dose information.

Figure 5:
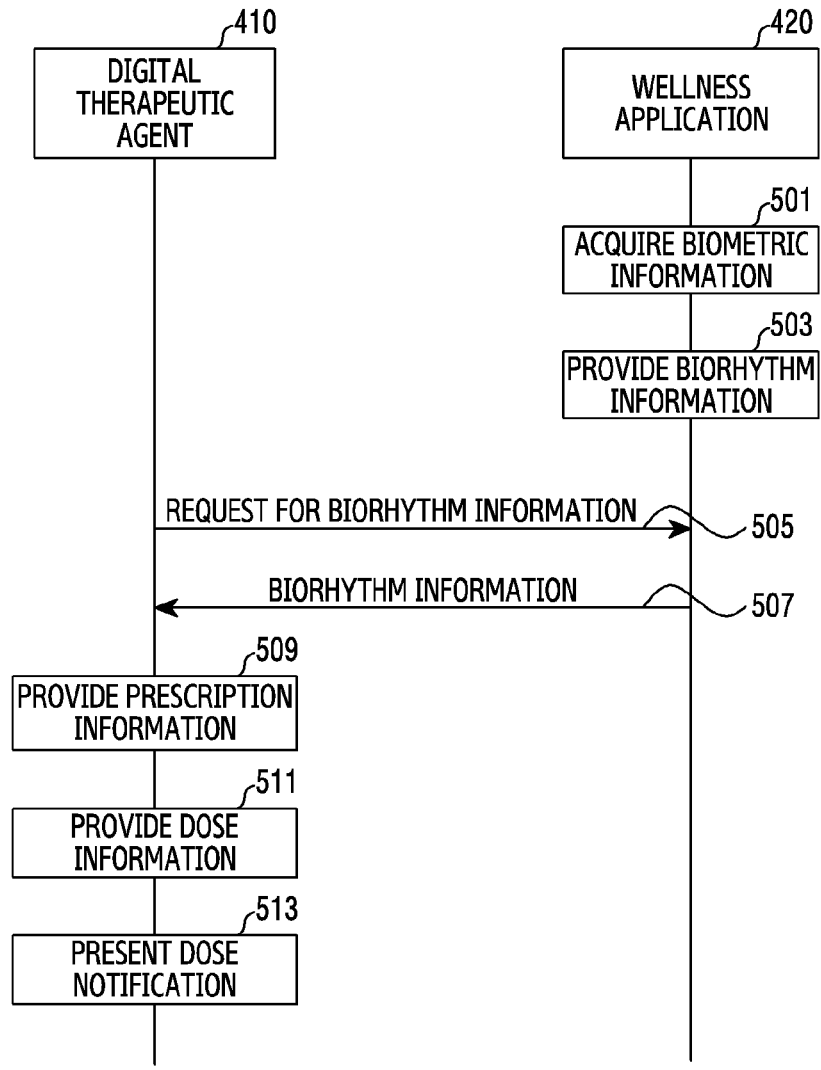
FIG. 5 is a diagram illustrating provision of dose information through a digital therapeutic agent according to an embodiment of the disclosure.
Figure 6:
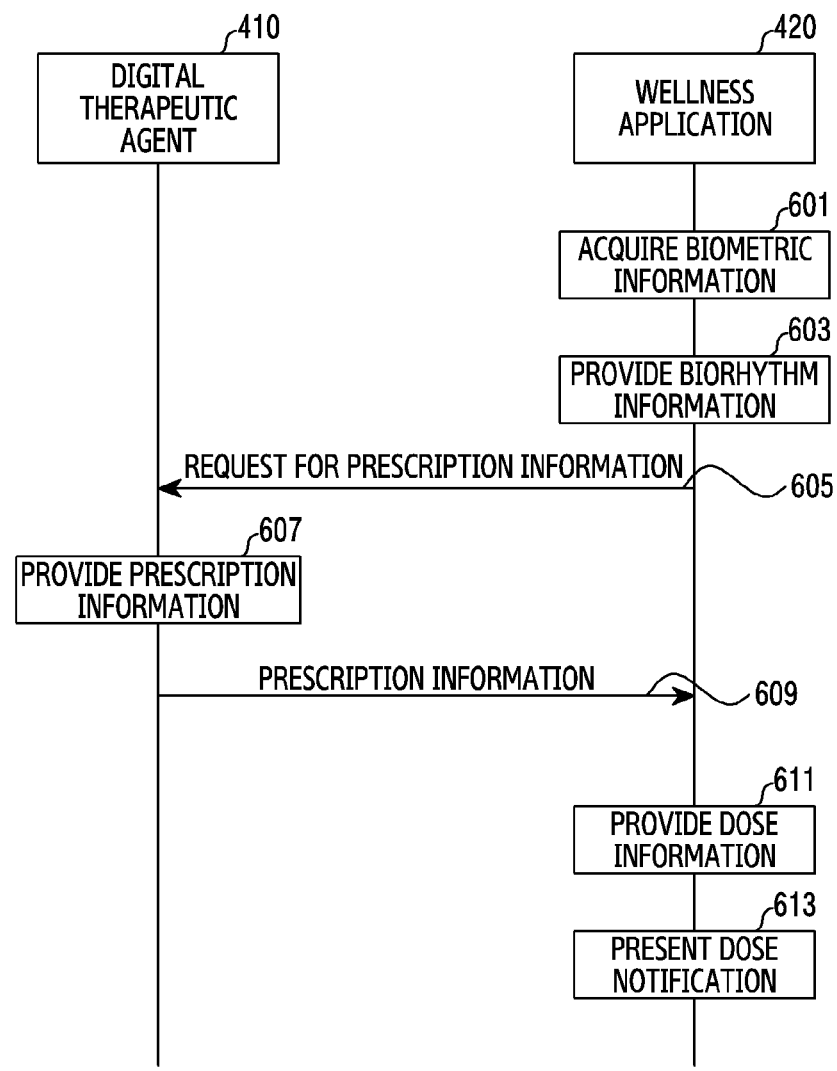
FIG. 6 is a diagram illustrating provision of dose information through a wellness application according to an embodiment of the disclosure.

FIG. 5 is a diagram illustrating provision of dose information through a digital therapeutic agent according to an embodiment of the disclosure. FIG. 6 is a diagram illustrating provision of dose information through a wellness application according to an embodiment of the disclosure.

Referring to FIG. 5, according to an embodiment of the disclosure, the electronic device 100 may install the at least one digital therapeutic agent application 410 and the wellness application 420, respectively, and present a dose notification through a method of data sharing between the applications.

According to an embodiment of the disclosure, the wellness application 420 may acquire biometric information of the user of the electronic device 100 by using the activity information collection module 421, the biometric information collection module 422, and the profile management module 423 (501, 601). In addition, an analysis result may be provided based on biometric information acquired through the biometric information analysis module 424. For example, the biometric information analysis module 424 may provide biorhythm information, based on the acquired biometric information (503, 603).

According to an embodiment of the disclosure, the at least one digital therapeutic agent application 410 may request biorhythm information to the wellness application 420 (505), and in response to this, the wellness application 420 may transmit the biorhythm information to the at least one digital therapeutic agent application 410 (507).

According to an embodiment of the disclosure, the at least one digital therapeutic agent application 410 may provide prescription information by using the prescription information collection module 240 (509). In addition, the at least one digital therapeutic agent application 410 may provide dose information through the dose information provision module 230, based on the biorhythm information and the prescription information received from the wellness application 420 (511). According to an embodiment of the disclosure, the at least one digital therapeutic agent application 410 may present a dose notification, based on the provided dose information (513).

According to another embodiment of the disclosure, the wellness application 420 may request prescription information to the at least one digital therapeutic agent application 410 (605). In response to the prescription information request (605), the at least one digital therapeutic agent application 410 may provide prescription information (607) and present the prescription information (609). According to an embodiment of the disclosure, the wellness application 420 may provide dose information, based on the prescription information, the biorhythm information, and/or the medication record information received through the at least one digital therapeutic agent application 410 (611). The wellness application 420 may provide the dose information through the dose information provision module 426. According to an embodiment of the disclosure, the wellness application 420 may present a dose notification, based on the provided dose information (613).

Figure 7:
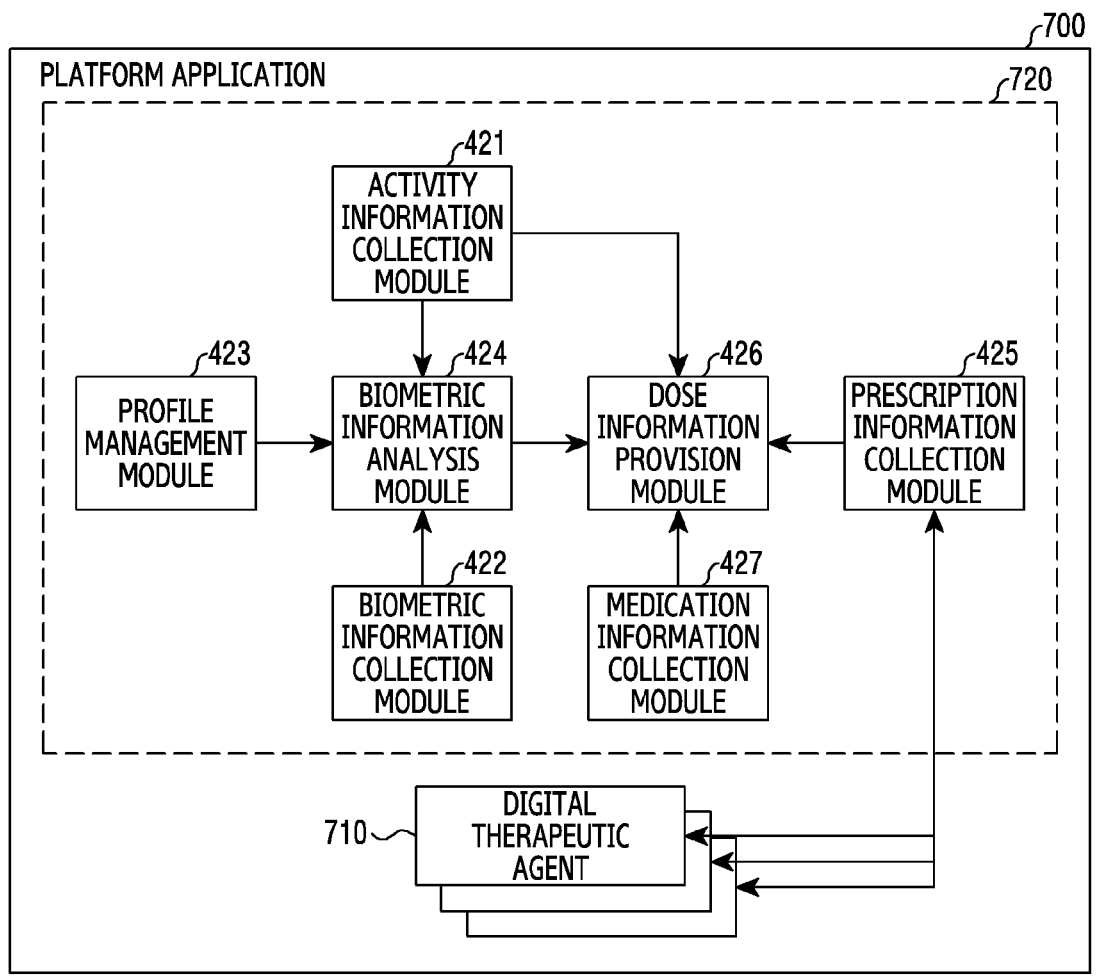
FIG. 7 is a diagram illustrating a platform application including at least one digital therapeutic agent according to an embodiment of the disclosure.

FIG. 7 is a diagram illustrating a platform application including at least one digital therapeutic agent according to an embodiment of the disclosure.

Referring to FIG. 7, the platform application 700 may include a health care module 720 and at least one digital therapeutic agent application 710. According to an embodiment of the disclosure, the platform application 700 may allow to install at least one digital therapeutic agent application 710, or download and install the same in a module form. The at least one digital therapeutic agent application 710 may present necessary activities, such as pre-registered activity, medication, or the like, as dose information, based on a pre-estimated biorhythm.

According to an embodiment of the disclosure, the at least one digital application 710 through which the user of the electronic device 100 may acquire prescription information may be registered in advance in the platform application 700. According to an embodiment of the disclosure, the health care module 720 may perform a function similar to that of the wellness application 420 described with reference to FIG. 4. In addition, the at least one digital therapeutic agent application 710 may perform a function similar to that of the at least one digital therapeutic agent application 410 described with reference to FIG. 4.

According to an embodiment of the disclosure, the platform application 700 may provide the prescription information through at least one digital therapeutic agent application 710, and may provide dose information through the dose information provision module 426 of the health care module 720, based on the prescription information, biorhythm information, and/or medication information.

According to an embodiment of the disclosure, the platform application 700 may present a notification to the user of the electronic device 100, based on the provided dose information.

Figure 8:
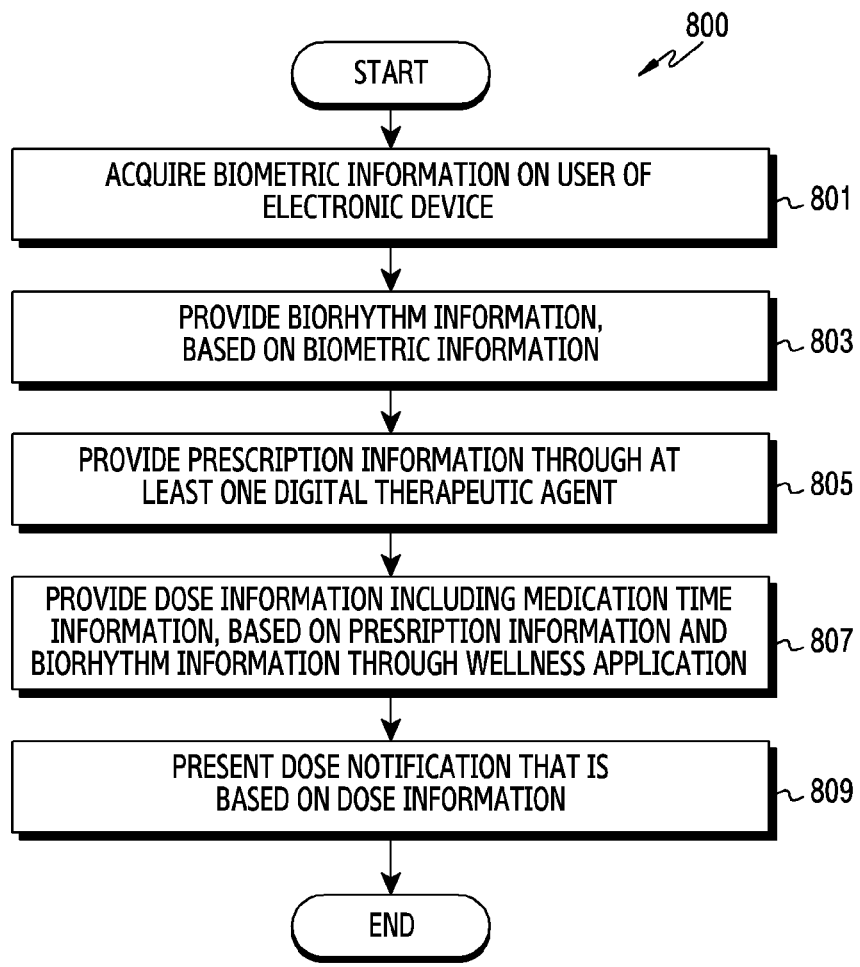
FIG. 8 is a flowchart illustrating an operation of providing dose information according to an embodiment of the disclosure.

FIG. 8 is a flowchart 800 illustrating an operation of providing dose information according to an embodiment of the disclosure.

Referring to FIG. 8, in operation 801, the processor 110 of the electronic device 100 may acquire biometric information about the user of the electronic device 100. According to an embodiment of the disclosure, the processor 110 may acquire the biometric information through the sensor module 150 of the electronic device 100. According to another embodiment of the disclosure, the processor 110 may acquire the biometric information by receiving the biometric information about the user from at least one external device through the communication circuit 130.

According to an embodiment of the disclosure, in operation 803, the processor 110 may provide biorhythm information, based on the biometric information. According to an embodiment of the disclosure, the processor 110 may provide the biorhythm information through the biometric information analysis module 424. In operation 805, the processor 110 of an embodiment may provide prescription information through at least one digital therapeutic agent. According to an embodiment of the disclosure, the processor 110 may provide the prescription information by executing the at least one digital therapeutic agent.

According to an embodiment of the disclosure, in operation 807, the processor 110 may provide medication information including medication time information, based on the prescription information and the biorhythm information, through a wellness application. For example, the processor 110 may execute the wellness application, to use the dose information provision module 426. In an embodiment of the disclosure, the dose information provision module 426 may provide dose information, based on the prescription information acquired through the prescription information collection module 425, and/or medication record information acquired through the biometric information analysis module 424 and/or the medication information collection module 427. For example, the processor 110 may derive a time when a user's physical recovery and physical activity ability is best exhibited from user's age and estimated biorhythm information, to recommend the user a time and exercise at which an exercise effect may be maximized. For another example, when a user's blood pressure is high, the processor 110 may provide the dose information wherein the user performs moderate-intensity or higher exercise for a specific time or longer. In addition, the processor 110 may recommend optimal and appropriate exercise cycle, exercise intensity, exercise time, and exercise start time point, or the like, adaptively to the user, based on measured user blood pressure information and a change of blood pressure after exercise. According to an embodiment of the disclosure, when the processor 110 recommends the moderate-intensity exercise suitably for a user's biorhythm, the processor 110 may measure a systolic/diastolic blood pressure lowered by an exercise effect in comparison to a normal systolic/diastolic blood pressure when the user does not exercise, to measure whether a corresponding change is sustained by the exercise, and recommend an appropriate moderate-intensity exercise at an appropriate time point.

According to an embodiment of the disclosure, in operation 809, the processor 110 may present a dose notification that is based on the dose information. For example, the processor 110 may control the display 140 to display the dose notification, based on the dose information.

Figure 9:
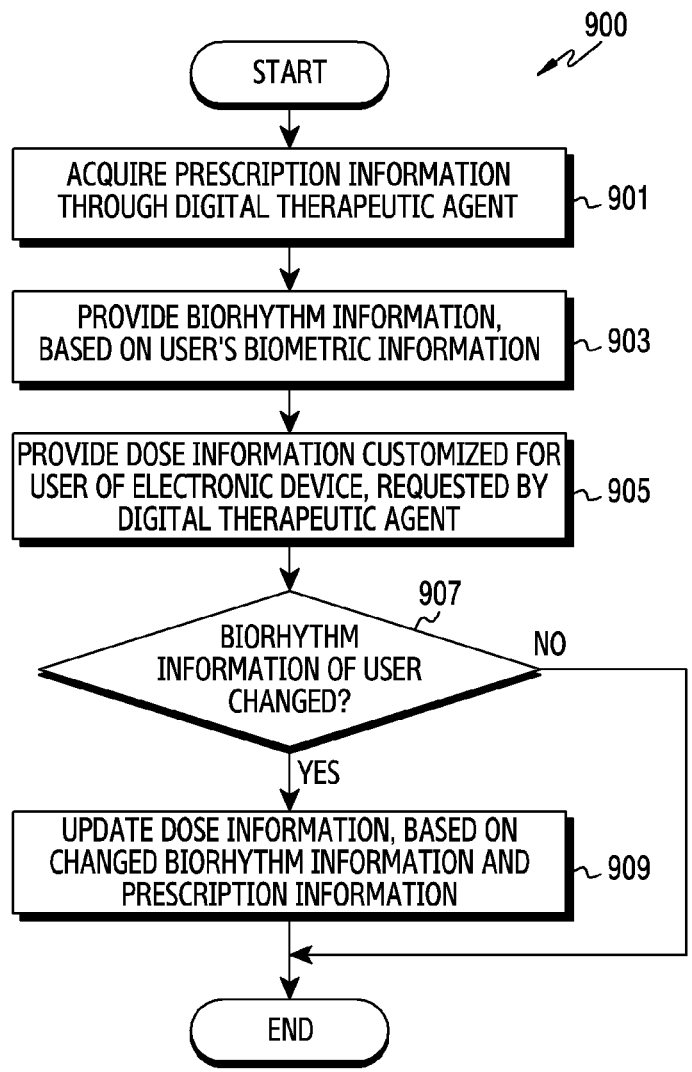
FIG. 9 is a flowchart illustrating an operation of updating dose information, based on a change of a biorhythm of a user of an electronic device according to an embodiment of the disclosure.

FIG. 9 is a flowchart 900 illustrating an operation of updating dose information, based on a change of a biorhythm of a user of an electronic device according to an embodiment of the disclosure.

Referring to FIG. 9, according to an embodiment of the disclosure, in operation 901, the processor 110 may acquire prescription information through a digital therapeutic agent. For example, the processor 110 may acquire, through the prescription information collection module 240, prescription information provided through at least one digital therapeutic agent application.

According to an embodiment of the disclosure, in operation 903, the processor 110 may provide biorhythm information, based on user's biometric information. According to an embodiment of the disclosure, operation 903 may be performed similarly to operation 803.

According to an embodiment of the disclosure, in operation 905, the processor 110 may provide dose information customized for the user of the electronic device 100, requested by the digital therapeutic agent. For example, the processor 110 may provide the dose information, based on the prescription information provided by the at least one digital therapeutic agent and the user's biorhythm information. According to an embodiment of the disclosure, operation 905 may be performed similarly to operation 807.

In operation 907, the processor 110 of an embodiment may determine whether the user's biorhythm information has been changed. For example, the processor 110 may determine whether the biorhythm information provided through the biometric information analysis module 220 has been updated through comparison with the existing biorhythm information. Or, the processor 110 may determine whether the biorhythm information is changed by updating activity information, biometric information, and/or profile information collected through the biometric information collection module 210.

According to an embodiment of the disclosure, when the biorhythm information is changed, the processor 110 may, in operation 909, update the dose information, based on the changed biorhythm information and prescription information. When the biorhythm information is not changed, the processor 110 may end the operation of updating the dose information.

Figure 10:
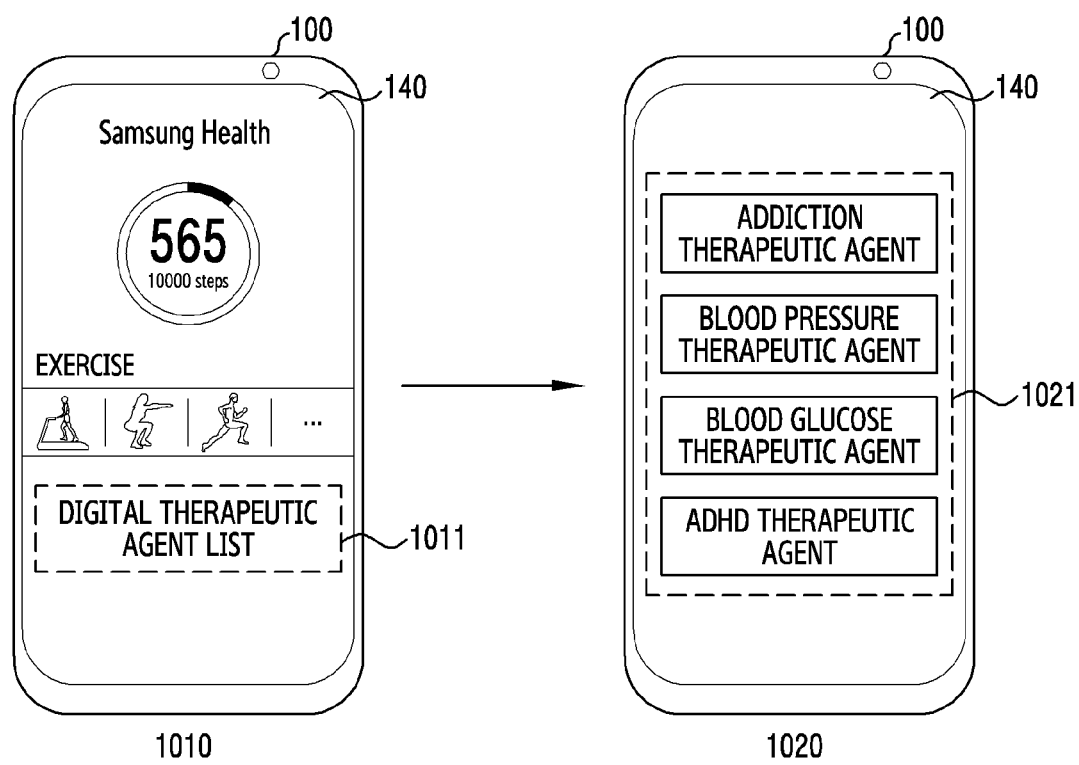
FIG. 10 is a diagram illustrating a user interface for executing a wellness application and a digital therapeutic agent according to an embodiment of the disclosure.

FIG. 10 is a diagram illustrating a user interface for executing a wellness application and a digital therapeutic agent according to an embodiment of the disclosure.

Referring to FIG. 10, a wellness application screen 1010 and a digital therapeutic agent application screen 1020 are shown. According to an embodiment of the disclosure, the processor 110 of the electronic device 100 may display the wellness application screen 1010 and the digital therapeutic agent application screen 1020 through the display 140.

According to an embodiment of the disclosure, the wellness application screen 1010 may include various visual objects related to a health of the user of the electronic device 100. For example, the wellness application screen 1010 may include visual objects for various activity information. For example, the wellness application screen 1010 may include a number of steps taken by the user, a sleep time, an amount of food, and the like. According to an embodiment of the disclosure, the wellness application screen 1010 may include a visual object indicating information 1011 about at least one digital therapeutic agent application stored in the memory 120 of the electronic device 100.

According to an embodiment of the disclosure, when an input for the visual object indicating the information 1011 about the digital therapeutic agent application of the user of the electronic device 100 is received, the processor 110 may execute at least one digital therapeutic agent application. For example, when a touch input for the visual object indicating the information 1011 about the digital therapeutic agent application is received, the processor 110 may control the display 140 to display the at least one digital therapeutic agent application screen 1020 displaying at least one digital therapeutic agent application list 1021.

According to an embodiment of the disclosure, when a user input for the at least one digital therapeutic agent application list 1021 is received, the processor 110 may provide a selected digital therapeutic agent application execution event. Thus, the digital therapeutic agent application may be executed.

Figure 11:
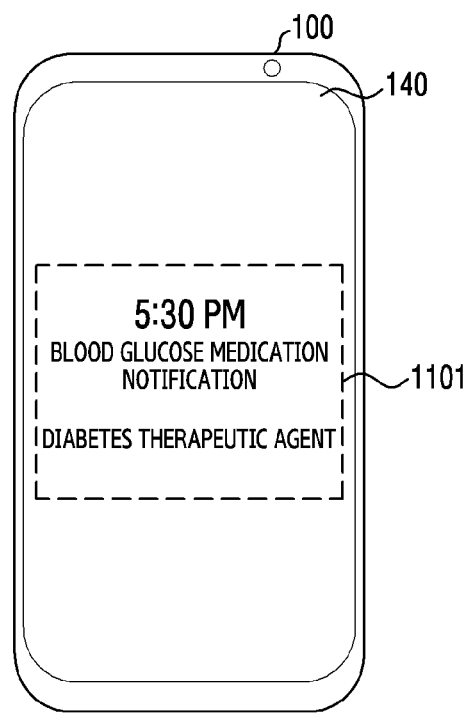
FIG. 11 is a diagram illustrating a dose notification user interface of an electronic device according to an embodiment of the disclosure.

FIG. 11 is a diagram illustrating a user interface presenting a medication notification through a display according to an embodiment of the disclosure.

Referring to FIG. 11, according to an embodiment of the disclosure, the processor 110 may provide medication information by executing a wellness application and/or at least one digital therapeutic agent application. For example, the processor 110 may present the medication notification, based on medication information provided through the dose information provision module 426 described with reference to FIG. 4. For example, the processor 110 may present a notification through the display 140, based on a medication time and medication content (e.g., activity prescription and/or medication prescription) included in the medication information.

According to an embodiment of the disclosure, the processor 110 may display a medication notification display 1101 through the display 140. For example, the processor 110 may display "blood glucose medication notification at 5:30 pm". According to an embodiment of the disclosure, when a medication notification is presented, the processor 110 may control the display 140 to display the digital therapeutic agent application that is a basis of the corresponding medication notification, together.

According to various embodiments of the disclosure, the medication notification display 1101 may be displayed in various methods.

Figure 12:
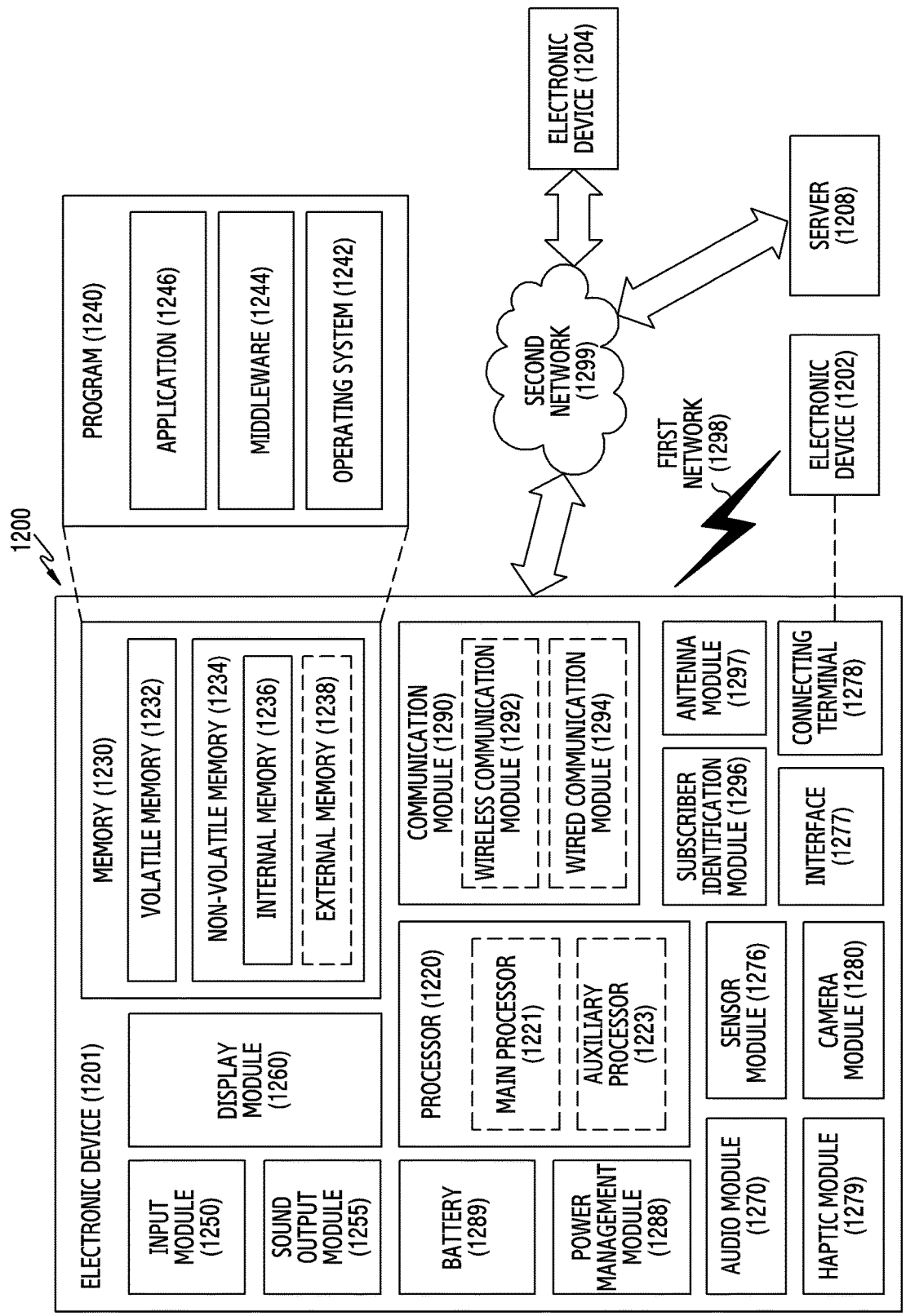
FIG. 12 is a block diagram of an electronic device in a network environment according to an embodiment of the disclosure.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, a memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in a volatile memory 1232, process the command or the data stored in the volatile memory 1232, and store resulting data in a non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thererto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

The connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the millimeter wave (mmWave) band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1) of an embodiment may include a communication circuit (e.g., the communication circuit 130 of FIG. 1), a display (e.g., the display 140 of FIG. 1), a memory (e.g., the memory 120 of FIG. 1) for storing a first application that presents a behavioral treatment regimen for a disease or lifestyle of a user of the electronic device 100 and a second application that manages user's health records, and at least one processor (e.g., the processor 110 of FIG. 1) electrically coupled to the display 140 and the memory 120. The at least one processor 110 may acquire biometric information about the user of the electronic device, provide biorhythm information, based on the acquired biometric information, provide prescription information through the first application, provide dose information, based on the prescription information and the biorhythm information, through the second application, and present a dose notification, based on the dose information. The dose information may include medication time information for the prescription information.

According to an embodiment of the disclosure, the memory may store a plurality of first applications, and the at least one processor may provide a plurality of prescription information through each of the plurality of first applications, and determine a plurality of medication time information that are based on each of the plurality of prescription information, based on the biorhythm information.

According to an embodiment of the disclosure, when the determination result is that overlapped time information is included among the plurality of medication time information that are based on each of the plurality of prescription information, the at least one processor may change the overlapped time information, based on the biorhythm information.

According to an embodiment of the disclosure, the at least one processor may receive the biometric information from at least one external device providing the biometric information, through the communication circuit.

According to an embodiment of the disclosure, the electronic device may further include at least one sensor each including at least one electrode. The at least one sensor may include at least one of an accelerometer sensor, a gyro sensor, a proximity sensor, an illuminance sensor, an iris sensor, a temperature/humidity sensor, an altitude sensor, and an electrocardiogram sensor.

According to an embodiment of the disclosure, the at least one processor may acquire the biometric information by using the at least one sensor.

According to an embodiment of the disclosure, the at least one processor may detect a change of the biometric information of the user according to a set period, acquire a user's medication record that is based on the dose information, and update the biorhythm information, based on the change of the biometric information and the medication record.

According to an embodiment of the disclosure, the at least one processor may receive a user input for the medication record or receive the medication record collected from at least one external device through the communication circuit and store the received medication record in the memory.

According to an embodiment of the disclosure, the at least one processor may control a display to display an activity notification or medication notification guide, based on the dose information.

According to an embodiment of the disclosure, the at least one processor may control the display to display at least one visual object related to the first application interlocking with the second application on an execution screen of the second application.

According to an embodiment of the disclosure, in response to receiving an input of the at least one visual object, the at least one processor may control the display to display an execution screen of the first application corresponding to the input.

According to an embodiment of the disclosure, the biorhythm information may be for a user's circadian cycle that is repeated at a predetermined cycle. The at least one processor may provide the biorhythm information, based on at least one of body weight, body fat, and electrocardiogram information.

According to an embodiment of the disclosure, the at least one processor may control the display to display a list of the first application interlocking with the second application on the execution screen of the second application.

As described above, a method of operating an electronic device may include storing, in a memory included in the electronic device, a first application that presents a behavioral treatment regimen for a disease or lifestyle of a user of the electronic device and a second application that manages user's health related records, acquiring biometric information about the user of the electronic device, providing biorhythm information, based on the biometric information, providing prescription information through the first application, providing dose information including medication time information, based on the prescription information and the biorhythm information, through the second application, and presenting a notification, based on the dose information.

According to an embodiment of the disclosure, the method of operating the electronic device may further include receiving the biometric information from at least one external device that provides the biometric information through a communication circuit of the electronic device.

According to an embodiment of the disclosure, the at least one external device may include at least one of a wearable device, a body weight scale, a blood glucose meter, and a pedometer.

According to an embodiment of the disclosure, the electronic device may include at least one sensor each including at least one electrode. The acquiring of the biometric information may include acquiring the biometric information by using the at least one sensor.

According to an embodiment of the disclosure, the method of operating the electronic device may further include detecting a change of the biometric information of the user according to a set period, acquiring a user's medication record that is based on the dose information, and updating the biorhythm information, based on the change of the biometric information and the medication record.

According to an embodiment of the disclosure, the biometric information may include at least one of a blood pressure, a blood glucose, an exercise amount, electrocardiogram information, an oxygen saturation, a life pattern, a diet, a body weight, a stress level, a body fat, a dosing time, sleep information, a heart rate, and a number of steps.

According to an embodiment of the disclosure, the method of operating the electronic device may further include displaying an activity notification including at least one of an exercise time, a sleep time, and a meal type or a medication notification guide including at least one of a type of dosed medicine, a dosage, and a dosing method, based on the dose information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry;
a display;
memory storing one or more computer programs, a first application, and a second application, the first application being configured to present a behavioral treatment regimen for a disease of a user of the electronic device, the second application being configured to manage exercise records of the user; and
one or more processors,
wherein the one or more computer programs include computer-executable instructions that, when executed by the one or more processors individually or collectively, cause the electronic device to:
acquire biometric information of the user,
execute the second application,
control the display to display an execution screen of the second application, wherein the execution screen includes first visual objects related to a plurality of exercises and at least one second visual object for interlocking with the first application, and
in response to receiving an input for the at least one second visual object in the execution screen of the second application:
execute the first application;
acquire, through the first application, prescription information for a medical treatment and an exercise treatment;
generate biorhythm information, that indicates a user's circadian cycle being repeated at a predetermined cycle, based on the biometric information and profile information of the user;
acquire time information on a time at which a user's physical recovery and physical activity ability is maximized based on a user's age and the biorhythm information;
generate dose information based on the prescription information and the time information, wherein the dose information comprises information on a medication time for the medical treatment, an exercise, among the plurality of exercises, to be recommended for the exercise treatment, and an exercise cycle for the exercise;
present a dose notification based on the dose information;
update the biorhythm information based on biometric information obtained after the exercise;
if the user's circadian cycle, in the updated biorhythm information, is not changed, present a notification for a first recommended time to perform the exercise based on the exercise cycle; and
if the user's circadian cycle, in the updated biorhythm information, is changed, present a notification for a second recommended time to perform the exercise based on an updated exercise cycle using the changed circadian cycle.

2. The electronic device of claim 1,
wherein the one or more computer programs further include computer-executable instructions that, when executed by the one or more processors individually or collectively, cause the electronic device to:
acquire, through the first application, a plurality of prescription information for different therapeutic agents, and
determine a plurality of medication time information based on the plurality of prescription information for the different therapeutic agents and the biorhythm information.

3. The electronic device of claim 2, wherein the one or more computer programs further include computer-executable instructions that, when executed by the one or more processors individually or collectively, cause the electronic device to:
in response to determining that overlapped time information is comprised among the plurality of medication time information that are based on each of the plurality of prescription information, change the overlapped time information based on the biorhythm information.

4. The electronic device of claim 1, wherein the one or more computer programs further include computer-executable instructions that, when executed by the one or more processors individually or collectively, cause the electronic device to:
receive, through the communication circuitry from at least one external device, the biometric information.

5. The electronic device of claim 1, further comprising:
at least one sensor,
wherein each of the at least one sensor comprises at least one electrode, and
wherein the at least one sensor comprises at least one of an accelerometer sensor, a gyro sensor, a proximity sensor, an illuminance sensor, an iris sensor, a temperature/humidity sensor, an altitude sensor, or an electrocardiogram sensor.

6. The electronic device of claim 5, wherein the one or more computer programs further include computer-executable instructions that, when executed by the one or more processors individually or collectively, cause the electronic device to:
acquire the biometric information by using the at least one sensor.

7. The electronic device of claim 1, wherein the one or more computer programs further include computer-executable instructions that, when executed by the one or more processors individually or collectively, cause the electronic device to:
receive a user input for a medication record or receive the medication record collected from at least one external device through the communication circuitry, and
store the medication record in the memory.

8. The electronic device of claim 1, wherein the one or more computer programs further include computer-executable instructions that, when executed by the one or more processors individually or collectively, cause the electronic device to:
control the display to display an exercise notification or medication notification guide based on the dose information.

9. The electronic device of claim 1, wherein the one or more computer programs further include computer-executable instructions that, when executed by the one or more processors individually or collectively, cause the electronic device to:
in response to receiving the input of the at least one second visual object in the execution screen of the second application, control the display to display an execution screen of the first application corresponding to the input.

10. The electronic device of claim 1, wherein the one or more computer programs further include computer-executable instructions that, when executed by the one or more processors individually or collectively, cause the electronic device to:
generate the biorhythm information based on at least one of body weight information, body fat information, and electrocardiogram information.

11. The electronic device of claim 1, wherein the one or more computer programs further include computer-executable instructions that, when executed by the one or more processors individually or collectively, cause the electronic device to:
control the display to display a list of therapeutic agents managed by the first application interlocking with the second application on an execution screen of the second application.

12. A method performed by an electronic device, the method comprising:
storing, in memory of the electronic device, a first application and a second application, the first application being configured to present a behavioral treatment regimen for a disease of a user of the electronic device, the second application being configured to manage exercise records of the user;
acquiring biometric information of the user;
executing the second application;
displaying, on a display of the electronic device, an execution screen of the second application, wherein the execution screen includes first visual objects related to a plurality of exercises and at least one second visual object for interlocking with the first application; and
in response to receiving an input for the at least one second visual object in the execution screen of the second application:
executing the first application,
acquiring, through the first application, prescription information for a medical treatment and an exercise treatment,
generating biorhythm information, that indicates a user's circadian cycle being repeated at a predetermined cycle, based on the biometric information and profile information of the user,
acquiring time information on a time at which a user's physical recovery and physical activity ability is maximized based on a user's age and the biorhythm information,
generating dose information based on the prescription information and the time information, wherein the dose information comprises information on a medication time for the medical treatment, an exercise, among the plurality of exercises, to be recommended for the exercise treatment, and an exercise cycle for the exercise,
presenting a dose notification based on the dose information,
updating the biorhythm information based on biometric information obtained after the exercise,
if the user's circadian cycle, in the updated biorhythm information, is not changed, presenting a notification for a first recommended time to perform the exercise based on the exercise cycle, and
if the user's circadian cycle, in the updated biorhythm information, is changed, presenting a notification for a second recommended time to perform the exercise based on an updated exercise cycle using the changed circadian cycle.

13. The method of claim 12, further comprising:
receiving, through communication circuitry of the electronic device from at least one external device, the biometric information.

14. The method of claim 13, wherein the at least one external device comprises at least one of a wearable device, a body weight scale, a blood glucose meter, or a pedometer.

15. The method of claim 12,
wherein the electronic device comprises at least one sensor, each of the at least one sensor comprising at least one electrode, and
wherein the acquiring of the biometric information comprises acquiring the biometric information by using the at least one sensor.

16. The method of claim 12, wherein the biometric information comprises at least one of a blood pressure, a blood glucose, an exercise amount, electrocardiogram information, an oxygen saturation, a life pattern, a diet, a body weight, a stress level, a body fat, a dosing time, sleep information, a heart rate, or a number of steps.

17. The method of claim 12, further comprising:
displaying, on the display of the electronic device, an exercise notification or a medication notification guide based on the dose information,
wherein the exercise notification comprises at least one of an exercise time, a sleep time, or a meal type, and
wherein the medication notification guide comprises at least one of a type of dosed medicine, a dosage, or a dosing method.

* * * * *